UNITED STATES PATENT OFFICE.

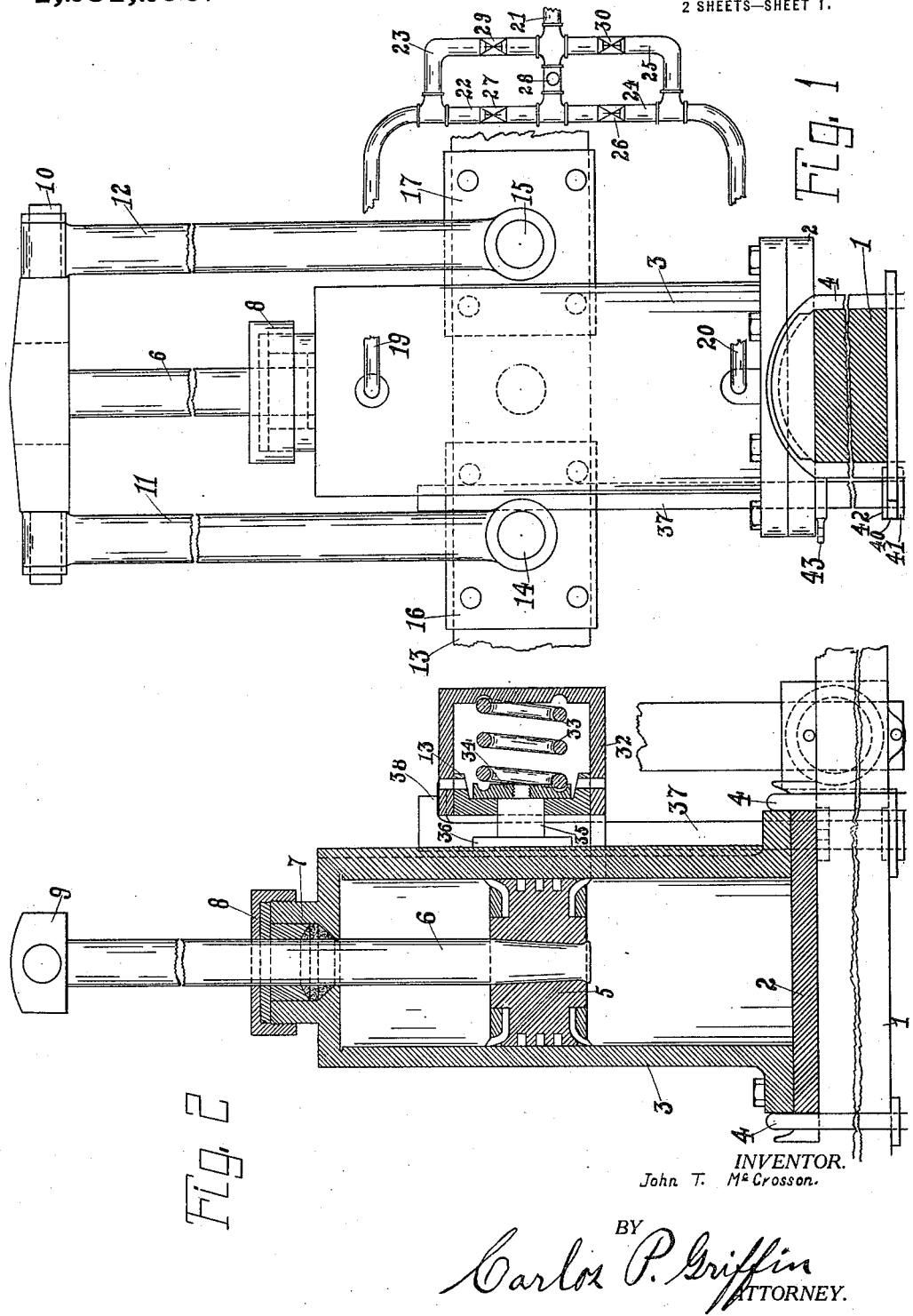

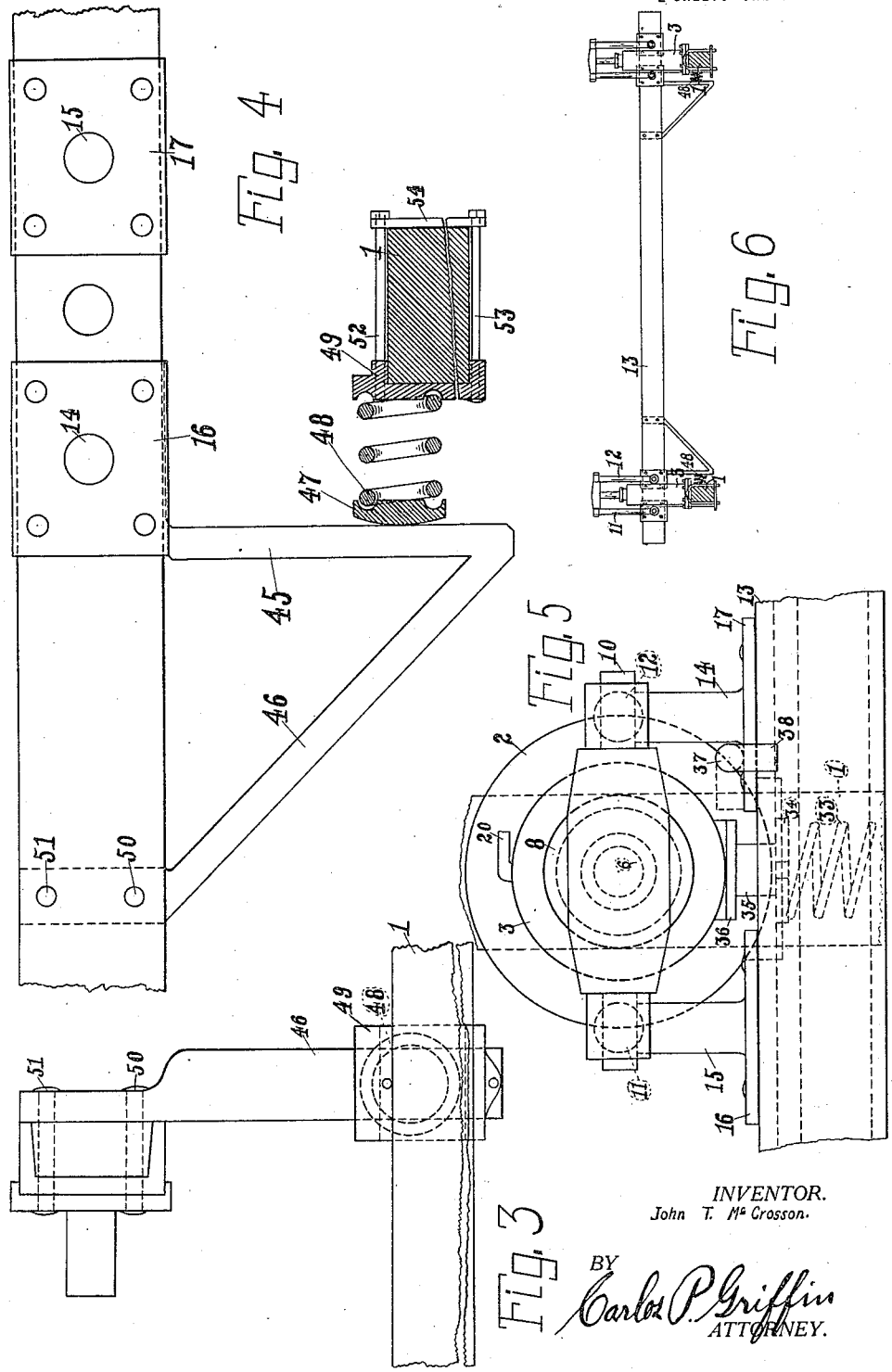

JOHN T. McCROSSON, OF SAN FRANCISCO, CALIFORNIA.

MOTOR-VEHICLE SUSPENSION.

1,281,256.　　　　　Specification of Letters Patent.　　Patented Oct. 8, 1918.

Application filed June 13, 1917, Serial No. 174,494.　Renewed September 6, 1918.　Serial No. 252,955.

*To all whom it may concern:*

Be it known that I, JOHN T. McCROSSON, a citizen of the United States, residing at San Francisco, State of California, have invented a new and useful Motor-Vehicle Suspension, of which the following is a specification in such full and clear terms as will enable those skilled in the art to construct and use the same.

This invention relates to a support for the frame of motor vehicles, an object of which is to dispense with springs for carrying the load, an air cushion or air cushions taking the place of the springs ordinarily used.

An embodiment of the invention is shown in the drawings in which the same reference numeral is applied to the same portion throughout, but I am aware that there may be modifications thereof.

Figure 1 represents a side elevation of one of the supports for the vehicle frame, there being one of said supports at each of the four corners of the frame, two over each axle, Fig. 2 is a vertical sectional view through the air cylinder and frame looking at right angles to Fig. 1, Fig. 3 is an end elevation of a portion of the vehicle frame showing one of the brackets for preventing excessive end motion of the frame with respect to the vehicle axle, Fig. 4 is a side elevation of a portion of the vehicle frame and one of the brackets for preventing end motion of said frame, Fig. 5 is a plan view of the supporting cylinder and a portion of the vehicle frame adjacent the same, and Fig. 6 is a side elevation on a reduced scale showing the position of the brackets and supporting cylinders with respect to the axles and vehicle frame.

The numeral 1 represents the vehicle axle, 2 a plate secured thereon which forms the bottom of the air cylinder 3. The plate 2 is connected with the vehicle axle by means of a common form of clip 4. The cylinder 3 has a piston 5 therein which is suitably connected to a piston rod 6. The piston rod passes out through a stuffing box 7, and a suitable gland 8 is used to prevent the escape of air from the cylinder. At the upper end, the piston rod carries a head 9. The head 9 has a pin 10 passing therethrough, which pin also passes through the upper ends of links 11 and 12, which links are connected to the main frame of the machine 13 by means of pins 14 and 15 carried by plates 16 and 17, which are suitably bolted to the vehicle. The air cylinder 3 has pipes 19 and 20 connected therewith at top and bottom respectively, which pipes are connected with a pipe 21 leading from a suitable source of compressed air supply through the pipes 22, 23, 24 and 25. The pipe system has suitable inwardly opening check valves 26, 27, a hand operated valve 28, and two automatic pressure regulating valves 29 and 30, all of said valves being of a well known form.

Secured on the frame of the machine adjacent each supporting cylinder is a short length of channel steel 32, which has a heavy spiral spring 33 placed therein and which bears upon a plate 34. The plate 34 has a stud 35 connected therewith, which carries the shoe 36 bearing upon the side of the cylinder 3, there of course being one of the shoes 36 for each cylinder in supporting the frame of the machine.

In order to determine the exact height to which the frame of the machine is to be raised, adjacent each cylinder there is mounted a rod 37 which has a horizontally turned arm 38 at its upper end. The rod 37 is placed adjacent the axle and passes through one of the plates 40, which secures one of the clips 4 in place. The rod has a collar 41 and a collar 42 to hold it in the proper position, and it is operated by means of an arm 43 which enables it to be turned to the position shown in Fig. 2 or to be turned to the position shown in Fig. 5 when the cylinders have been filled.

In order to prevent the vehicle frame from moving longitudinally with respect to the axles of the machine more than an allowable amount, there are four V-shaped fixtures secured to the machine frame. These fixtures each have a vertical leg 45 and an inclined brace 46. They each bear upon a hardened washer 47, which washer in turn bears upon and is held in place by means of a heavy spiral spring 48, the spring bearing upon a plate 49 secured to the axle 1. The member 45 is connected to the frame of the vehicle by means of the same bolts or rivets which connected the plate 16 while the other end is connected to the frame by means of other rivets or bolts 50, 51. The plate 49 is connected to the axle by means of bolts 52, 53, a plate 54 being used for the nuts of said bolts to bear upon.

The operation of the apparatus is as follows:—Assuming the cylinders to be empty, the rods 37 are turned upon their vertical axes, so as to bring the horizontal members 38 over the frame of the machine. The valve 28 is then opened to permit each of the cylinders 3 to fill with air under the desired pressure, whereupon the frame of the vehicle will be lifted up until it contacts with the members 38. Thereupon air may be admitted under pressure to the top of the cylinder 3 above the piston 5; the valves 29 being set to prevent the pressure in the upper part of the cylinder from falling below a predetermined minimum, and in the same way the valve 30 is set to prevent the air in the lower part of the cylinder below the piston 5 from falling below a predetermined minimum as it might if the piston 5 moved up too far under a very heavy rebound. When once set as above described, the rods 37 are then turned to bring their horizontal members 38 out of engagement with the frame of the vehicle, whereupon the vehicle is free to be operated, and will be supported entirely upon the air cushions formed by the cylinders at the four corners of the frame.

Having thus described my invention what I claim as new and desire to secure by Letters Patent of the United States, is as follows, express reservation being made of permissible modifications.

1. A motor vehicle suspension comprising axles and a vehicle frame, a plurality of cylinders supported by the axles, and each having a piston and piston rod connected with the vehicle frame, means to maintain the cylinders under a pressure higher than a predetermined minimum above and below the pistons, a spring pressed shoe bearing on each cylinder to prevent excessive lateral movement of the vehicle frame, and depending brackets connected with the vehicle frame and bearing upon springs against the vehicle axles, for preventing undue longitudinal movement of the vehicle frame.

2. A motor vehicle suspension comprising a frame and supporting axles therefor, a series of cylinders supported by the axles, and each having a piston and piston rod connected with the vehicle frame, means to prevent the vehicle frame from being raised more than the proper amount when the cylinders are being first filled, means to maintain the cylinders under a pressure higher than a predetermined minimum at all times during the operation of the vehicle, a spring braced shoe bearing upon each cylinder for preventing undue lateral movement of the vehicle frame, and a series of brackets for preventing undue longitudinal movement of the vehicle frame.

In testimony whereof I have hereunto set my hand this 6th day of June A. D. 1917.

JOHN T. McCROSSON.

Copies of this patent may be obtained for five cents each, by addressing the "Commissioner of Patents, Washington, D. C."